(12) United States Patent
Ferrer Vidal

(10) Patent No.: US 6,340,324 B1
(45) Date of Patent: Jan. 22, 2002

(54) METHOD AND CORRESPONDING APPARATUS FOR THE PRODUCTION OF HONEYCOMBS FOR BEEKEEPING

(75) Inventor: Carlos Ferrer Vidal, Barcelona (ES)

(73) Assignee: Breat, S.L., Sant Adria de Besos (ES)

( * ) Notice: Subject to any disclaimer, the term of this patent is extended or adjusted under 35 U.S.C. 154(b) by 0 days.

(21) Appl. No.: 09/618,833

(22) Filed: Jul. 18, 2000

(30) Foreign Application Priority Data

Jul. 27, 1999 (ES) ............................................. 9901689

(51) Int. Cl.⁷ .............................................. A01K 47/04
(52) U.S. Cl. ............................................. 449/2; 449/60
(58) Field of Search .............................. 449/2, 44, 60, 449/61; 425/440; 264/177.12, 310

(56) References Cited

U.S. PATENT DOCUMENTS

| | | | |
|---|---|---|---|
| 1,751,430 A | * | 3/1930 | Thomson .................... 264/162 |
| 2,561,147 A | | 7/1951 | Smith ......................... 449/44 |

FOREIGN PATENT DOCUMENTS

| | | |
|---|---|---|
| DE | 382156 C | 10/1921 |
| EP | 0893234 A | 1/1999 |
| FR | 646491 | 11/1928 |
| FR | 654530 A | 4/1929 |
| FR | 2560746 A | 9/1985 |
| WO | WO 90 06219 A | 6/1990 |

* cited by examiner

Primary Examiner—Robert P. Swiatek
(74) Attorney, Agent, or Firm—Darby & Darby

(57) ABSTRACT

Molding both faces of a honeycomb simultaneously by the action of respective belts carrying cores having resilience properties and, after cooling of the honeycomb, subjecting it to compression on both faces to separate the cores from the walls of the cells. The apparatus comprises two endless belts which are arranged opposite one another and are mounted between respective pairs of guide drums and both of which are provided with resilient cores of a shape complementary to that of the cells to be produced, the last pair of drums being capable of exerting a compression force against both faces of the honeycomb produced in order to detach it from the cores.

6 Claims, 4 Drawing Sheets

METHOD AND CORRESPONDING APPARATUS FOR THE PRODUCTION OF HONEYCOMBS FOR BEEKEEPING

The present invention relates to a method and to corresponding apparatus for the production of honeycombs for beekeeping which have considerable advantages over the prior art.

The Applicant's patent of invention 9701564 and his patent of addition 9801156 disclosed a method and apparatus for the production of honeycombs for beekeeping in which two endless belts, arranged opposite one another and quite close together, moved in the same direction, one of the belts having a relief structure formed by a plurality of projections which, individually, adopted the shape of a cavity of a honeycomb. This structure produced a half honeycomb which was subsequently joined to another half, forming a complete honeycomb. However, in practice, considerable difficulties were encountered in achieving a firm fixing of the two half honeycombs to form a complete honeycomb.

The lack of good adhesion between the two halves of the honeycombs corresponding to the prior art also presented the difficulty that the bees tend to deposit honey in the interstices, forming additional cells, which hinders the removal of the honeycombs from the beehives and the subsequent centrifugation thereof to extract the honey.

Moreover, the difficulties with the adhesion or fixing of the two halves making up a honeycomb, as well as the labour required for this work are not negligible.

The present invention is intended to solve these problems, disclosing means for producing the complete honeycomb in a manner such that, at the output of the production apparatus, no further stage is required in addition to the cutting of the honeycomb to length.

The method of the present invention is based on the moulding of the two halves of the honeycomb simultaneously, starting with two endless belts both of which are provided with cores made of silicone or the like, and respective runs of which are arranged parallel to one another with a separation suitable for the dimensions of the cores. In order to remove the honeycombs, in the method of the invention, the resilience characteristics of silicone and the plasticity characteristics of wax are utilized so that, once the wax constituting the honeycomb has solidified due to cooling, the two belts carrying the cores pass around two drums which compress them, reducing the height of the cells formed and expanding the silicone cores. Subsequent release of the belts upon passing over the said drums allows the cores to be reduced in cross-section, and to be separated from the cells.

The honeycomb element has sufficient firmness to remain intact during the final separation of the belts upon their passage over the driving drums.

In this last stage the provision of some auxiliary rollers is envisaged to help to keep the honeycomb equidistant during the final separation stage.

The apparatus for the production of honeycombs for beekeeping according to the present invention will comprise two belts, which are provided with cores, are arranged opposite one another, and are mounted on a pair of input drums and a pair of output drums which also perform the compression function and which can be moved so that the cores are not deformed in the rest condition.

A further improvement furnished by the invention is that the input drums which receive the liquid wax are formed with a reduced diameter, much smaller than that of the output drums, to facilitate the penetration of the liquid wax since the cores are separated to a greater extent. The larger diameter of the output drums is established because the separation of one core from the following one is thus smaller and they do not drag the honeycomb upwards or downwards by friction.

For a better understanding of the method and apparatus of the present invention, some drawings of a preferred embodiment thereof are appended by way of non-limiting example.

Figure 1:
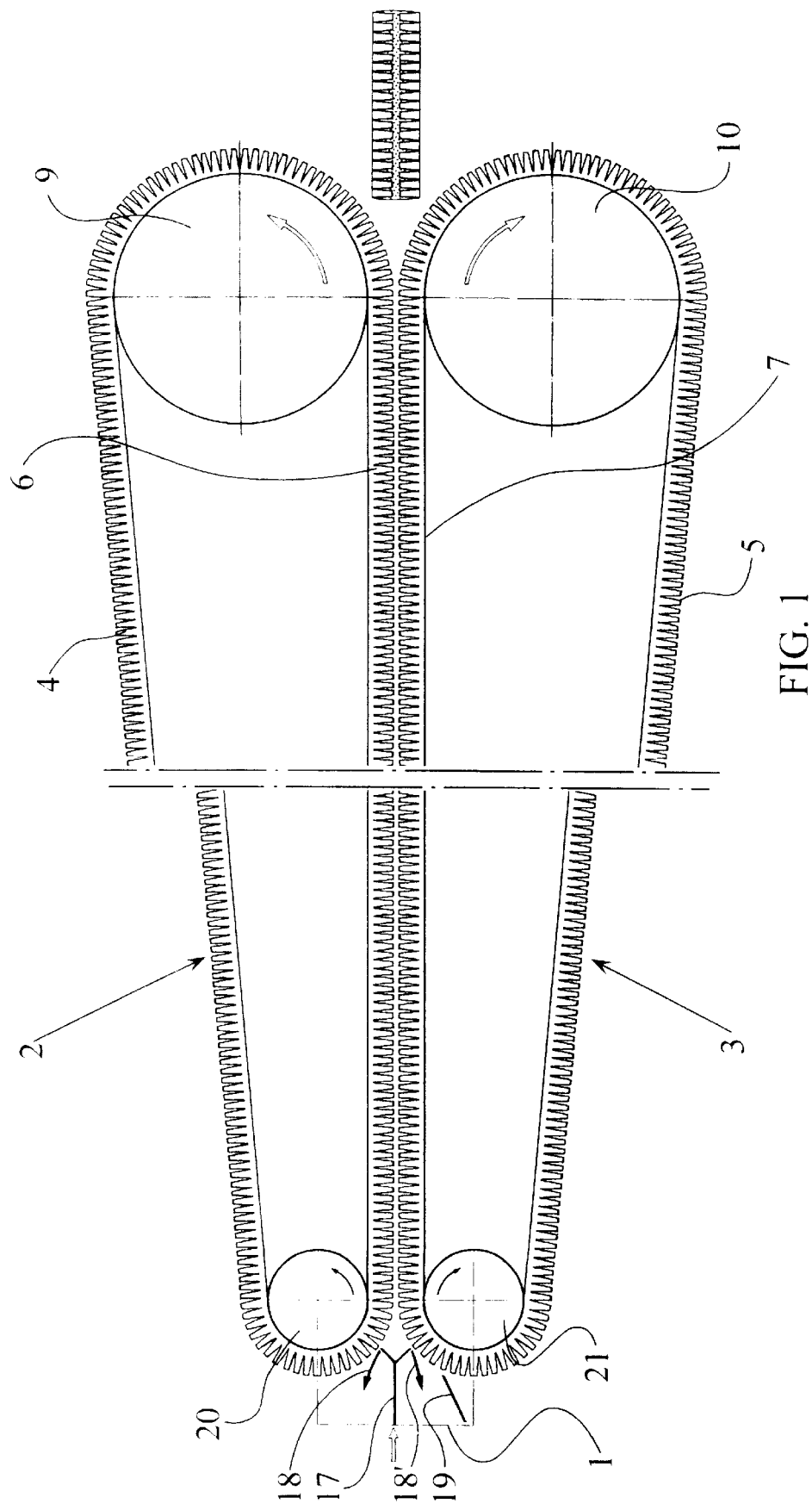
FIG. 1 shows schematically the unit formed by the two endless belts carrying the cores.
Figure 2:
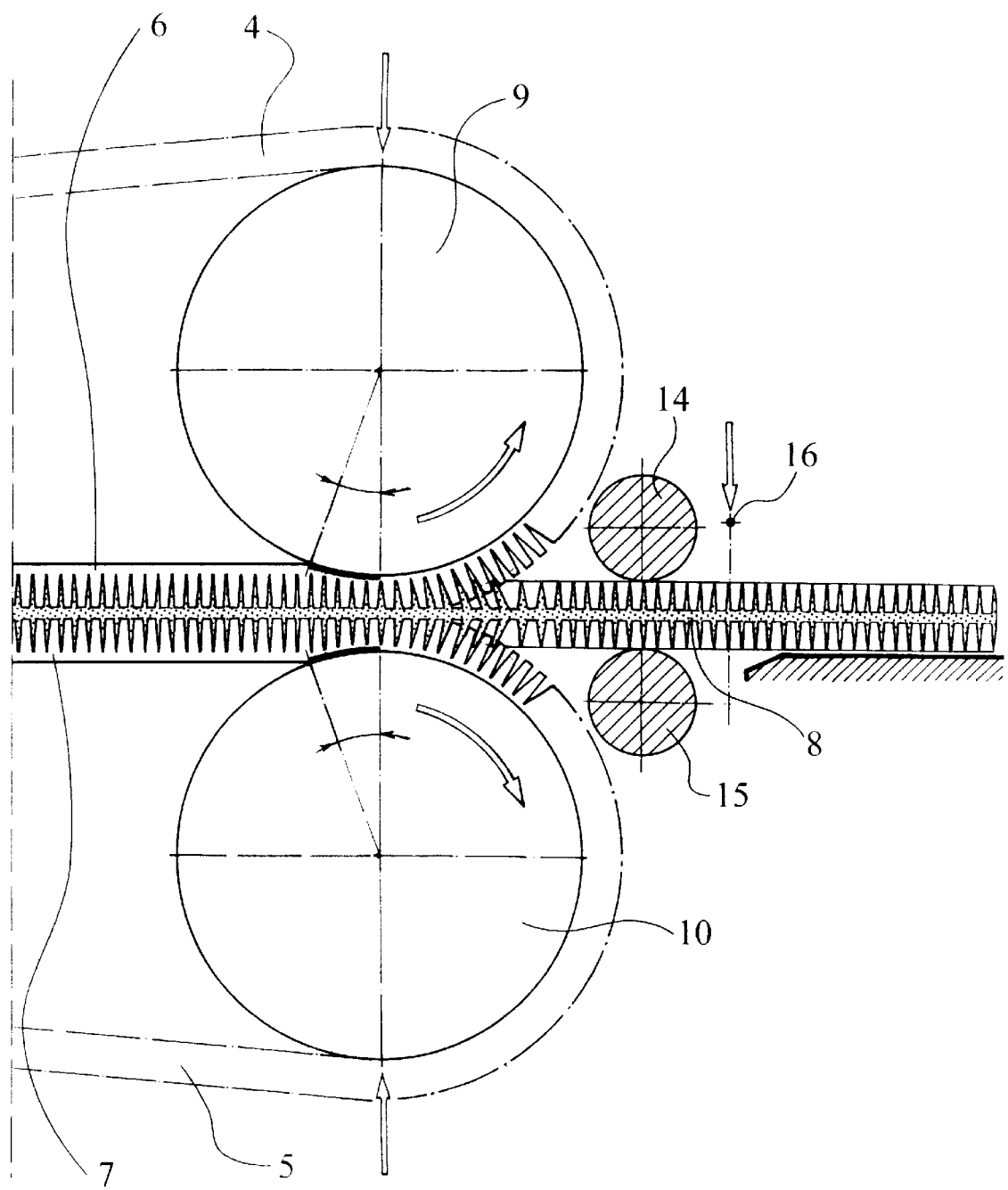
FIG. 2 shows a detail of the compression drums at the end of the manufacturing process.
Figure 3:
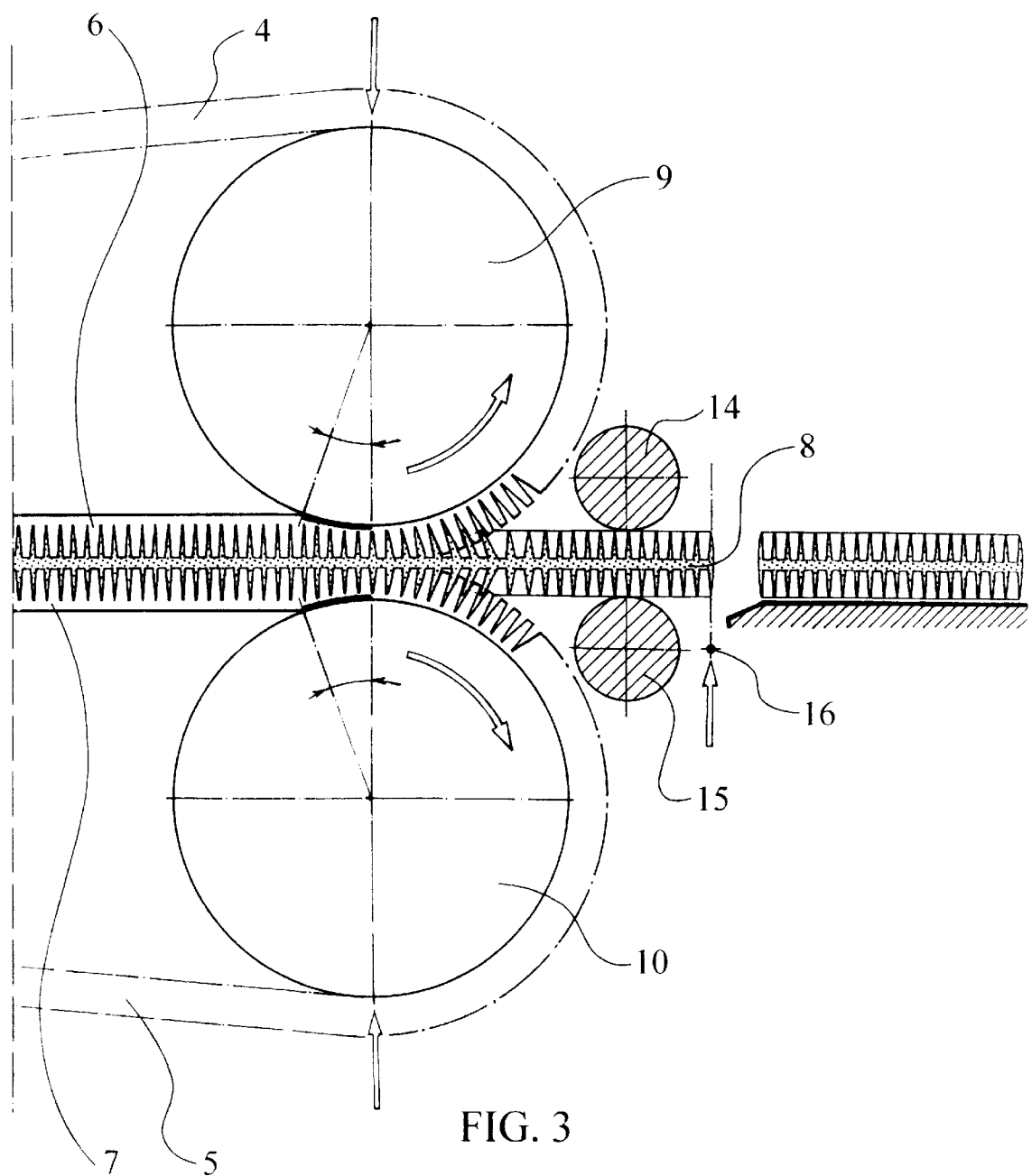
FIG. 3 is a schematic view similar to FIG. 2, with an indication of the region in which the manufactured honeycombs are cut.
Figure 4:
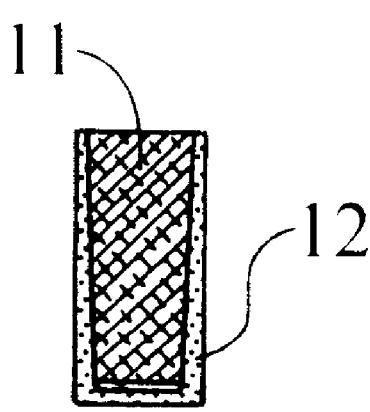
FIGS. 4 to 7 show, in section and schematically, various stages of the separation of the cores from a cell moulded in the honeycomb.

According to the present invention, the method for the production of honeycombs comprises the admission of wax from a suitable container 1 situated at the input end of the unit formed by the two endless belts 2 and 3 which are provided with sets of cores 4 and 5, respectively, the cores extending over the entire outer surface of the belts and having shapes complementary to those of the cells of the honeycombs to be produced. The was is admitted by being projected over the cores with a certain pressure as shown schematically in FIG. 1, which shows a wax input duct 17 and two projection tubes 18 and 18' for directing the wax towards the cores. A continuous flow of wax is thus established, wax being returned to the reservoir, for example, by means of the lower return ramp 19. As the inner runs 6 and 7 of the belts pass parallel to one another with a separation suitable for the dimensions of the honeycomb and with the same direction of movement, the wax admitted from the container 1 is shaped in accordance with the cores of said passes 6 and 7 which form a complete honeycomb, as indicated at 8 in FIGS. 2 and 3.

Figure 5:
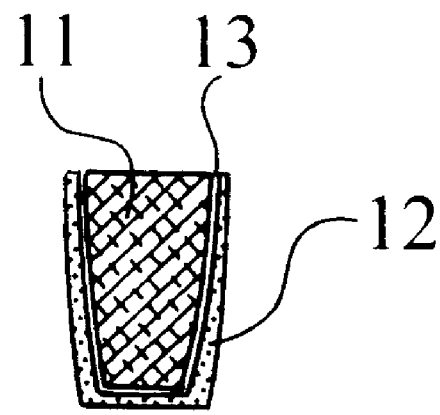
Figure 6:
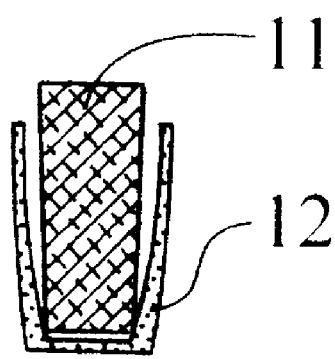
Figure 7:
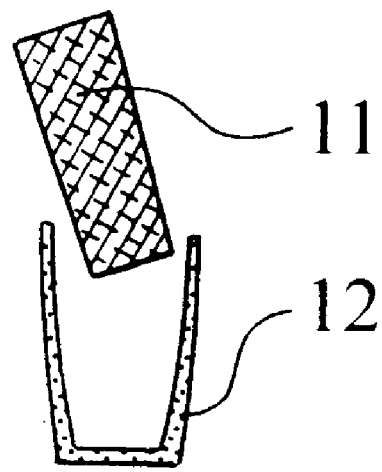

It is essential, in the method and apparatus of the present invention, that the end drums 9 and 10 can be compressed against one another, thus compressing the cores against the cells, which have already cooled sufficiently at the level of the drums. This is essential for easy detachment of the cores from the honeycomb produced and has been shown schematically in FIGS. 4 to 7, in which it is possible to appreciate, in the first place, the mass 11 of a core which has formed a cell 12 of a honeycomb and which, at the moment of compression between the drums 9 and 10, shown in FIG. 5, will be reduced in height, the core 11 being separated from the walls of the cell 12, forming a space 13. When the compression force ceases, the resilience of the core will cause it to regain height, as shown in FIG. 6, the core 11 finally going on to be separated from the cell 12 with the aid of the end rollers 14 and 15 disposed at the output of the drums 9 and 10. The honeycomb leaving the machine in continuous form will then be cut by means of a device, schematically indicated 16, of any type, which may be constituted by a hot wire, infra-red rays, a blade, a curtain of hot air, or other mechanical or thermal systems.

The input drums 20 and 21 have a much smaller diameter than the output drums 9 and 10 to facilitate the penetration of the liquid wax since the cores are separated to a greater extent. At the output, the larger-diameter drums permit a smaller separation between one core and the adjacent core and the honeycomb is not dragged upwards or downwards in position.

What is claimed is:

1. A method for the production of honeycombs for beekeeping which comprises molding a mass of hot wax by the action of cores of an endless belt, the cores being of a shape complementary to that of the cells, characterized in that both faces of the honeycomb are moulded simultaneously by the action of respective belts carrying cores having resilience properties, and after the honeycomb has cooled, compressing it on both faces to allow the cores to be separated from the walls of the cells, taking advantage of the resilience of the cores and their ability to regain their shape and of the plasticity of the cells and the permanent deformation brought about therein.

2. A method for the production of honeycombs for beekeeping according to claim 1, characterized in that the wax is supplied by being projected over the cores with a certain pressure by means of ducts directed towards the cores in the input region, means at the same time being available for allowing the surplus wax to return to the reservoir.

3. Apparatus for the production of honeycombs for beekeeping in accordance with the method of claim 1, characterized in that it comprises two endless belts which are arranged opposite one another and are mounted between respective pairs of guide drums, and both of which are provided with resilient cores of a shape complementary to the cells to be produced, the cores extending over the entire outer surface of the conveyor belts, which are arranged close together and parallel to one another, moving in the same direction and in a manner such that the last pair of drums can exert a compression force against both faces of the honeycomb produced in order to bring about its detachment from the cores.

4. Apparatus for the manufacture of honeycombs for beekeeping in accordance with claim 3, characterized in that the terminal drums of the endless belts carrying the cores have a capability for moving away from the honeycomb to prevent compression forces on the cores in the rest position.

5. Apparatus for the manufacture of honeycombs for beekeeping in accordance with claim 3, characterized by the provision of a pair of rollers which are situated at the output of the drums for compressing the honeycomb, and which can keep the honeycomb in position at the output of the belts, upstream of a device for cutting a continuous honeycomb to length.

6. Apparatus for the manufacture of honeycombs for beekeeping in accordance with claim 3, characterized in that the guide drums of the endless belts situated at a wax input have a considerably smaller diameter than the drums for the output of the shaped honeycombs, to facilitate the penetration of liquid wax.

* * * * *